US012650096B2

(12) United States Patent
Donahue et al.

(10) Patent No.: US 12,650,096 B2
(45) Date of Patent: Jun. 9, 2026

(54) SYSTEM AND METHOD HAVING AN ANTI-POLISHING RING FOR A PISTON

(71) Applicant: INNIO Jenbacher GmbH & Co OG, Jenbach (AT)

(72) Inventors: Richard John Donahue, West Bend, WI (US); Wolfgang Fimml, Maurach in Tirol (AT); Steinbjörn Jónsson, Birgitz in Tirol (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/924,922

(22) Filed: Oct. 23, 2024

(65) Prior Publication Data

US 2026/0110271 A1 Apr. 23, 2026

(51) Int. Cl.
*F02F 1/00* (2006.01)

(52) U.S. Cl.
CPC ........ *F02F 1/004* (2013.01); *F02F 2001/006* (2013.01)

(58) Field of Classification Search
CPC ............................ F02F 1/004; F02F 2001/006
See application file for complete search history.

(56) References Cited

U.S. PATENT DOCUMENTS

| | | | | |
|---|---|---|---|---|
| 2,624,328 A * | 1/1953 | Grinham | F02F 1/18 123/193.4 |
| 5,553,585 A * | 9/1996 | Paro | F16J 10/04 123/193.2 |
| 6,367,463 B1 * | 4/2002 | Nurmi | F02F 11/005 123/193.2 |
| 8,459,175 B2 * | 6/2013 | Blythe | F16J 10/04 92/171.1 |
| 9,359,971 B2 * | 6/2016 | Donahue | F02F 1/004 |
| 9,938,925 B2 * | 4/2018 | Morgan | F02F 1/004 |
| 11,002,216 B1 * | 5/2021 | Singh | F16J 9/20 |
| 11,187,180 B2 * | 11/2021 | Svensson | F16J 1/09 |
| 11,920,538 B2 * | 3/2024 | Summerfield | F16J 10/04 |
| 2007/0246026 A1 * | 10/2007 | Azevedo | F02F 1/163 123/193.2 |
| 2023/0332558 A1 * | 10/2023 | Yamamoto | F02F 11/002 |
| 2025/0188886 A1 * | 6/2025 | Sato | F02F 1/00 |

FOREIGN PATENT DOCUMENTS

EP 2976184 B2 11/2020

OTHER PUBLICATIONS

Kevin, "Pistons Aren't Round: Profile and Ovality Explained", Wiseco, May 29, 2019, 6 pgs.

* cited by examiner

*Primary Examiner* — Dustin T Nguyen
(74) *Attorney, Agent, or Firm* — Fletcher Yoder, P.C.

(57) ABSTRACT

A system includes a cylinder liner assembly configured to line a cylinder around a tight top land piston. The cylinder liner assembly includes a cylinder liner having an inner liner surface extending circumferentially about a central axis and an anti-polishing ring.

20 Claims, 7 Drawing Sheets

SYSTEM AND METHOD HAVING AN ANTI-POLISHING RING FOR A PISTON

BACKGROUND

The subject matter disclosed herein relates to reciprocating pistons and, more specifically, to a system and method for mitigating carbon formation on an exterior surface of a piston.

Pistons are used in a variety of machines, such as pumps, compressors, and reciprocating piston-cylinder internal combustion engines (i.e., reciprocating engines). In reciprocating engines, carbon deposits resulting from the combustion of fuel may build up around a perimeter of a top portion of the piston. The build up of carbon deposits leads to a polishing of a cylinder liner (e.g., bore polishing) due to the friction between the piston and the cylinder liner. Overtime, this polishing can lead to increased emissions and potential damage to the reciprocating engine. Accordingly, a need exists for mitigating carbon formation about the exterior surface of pistons.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the present disclosure. Indeed, the present disclosure may encompass a variety of forms that may be similar to or different from the embodiments set forth below.

In an embodiment, a system includes a cylinder liner assembly configured to line a cylinder around a tight top land piston. The cylinder liner assembly includes a cylinder liner having an inner liner surface extending circumferentially about a central axis and an anti-polishing ring.

In another embodiment, a system includes a piston having a tight top land. The system also includes a cylinder liner. The cylinder liner includes an anti-polishing ring having a tapered portion. The tapered portion is configured to overlap the tight top land when the piston is disposed in a top dead center position.

In another embodiment, a method includes providing a cylinder liner comprising an inner liner surface extending circumferentially about a central axis. The method also includes providing an anti-polishing ring, wherein cylinder liner and the anti-polishing ring are portions of a cylinder liner assembly configured to line a cylinder around a tight top land piston.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
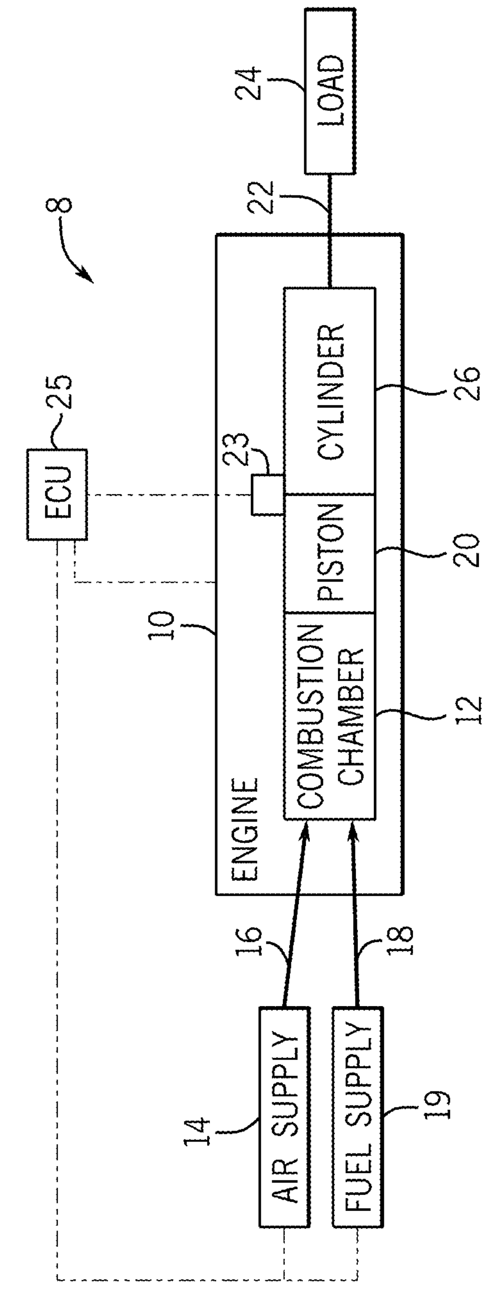
FIG. 1 is a schematic of an embodiment of a reciprocating engine coupled to a load in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles “a,” “an,” “the,” and “said” are intended to mean that there are one or more of the elements. The terms “comprising,” “including,” and “having” are intended to be inclusive and mean that there may be additional elements other than the listed elements.

The disclosed embodiments provide a system and method for using a piston (e.g., tight top land [TLL] piston) with a cylinder liner assembly having a positioned (e.g., clocked) anti-polishing ring having a protrusion, wherein the positioning or clocking may be achieved with one or more fasteners that hold a circumferential position of the anti-polishing ring. By securing the anti-polishing ring to the cylinder liner, the cylinder liner assembly may be honed in one liner clamping, thereby reducing the concentricity offset between the anti-polishing ring and the cylinder liner. Additionally, separating the anti-polishing ring from the cylinder liner may enable removal of the piston from the cylinder liner (e.g., cylinder) from a top side of the cylinder liner, thereby providing easier access for maintenance. Additionally, the anti-polishing ring having the protrusion as disclosed herein also mitigates bore polishing of the cylinder liner by mitigating the formation of carbon deposits about the piston.

Embodiments of the cylinder liner assembly may include an anti-polishing ring that is coupled to a top portion of a cylinder liner, which encloses a piston. The cylinder liner assembly may be used in any suitable machine, including but not limited to a reciprocating engine, a pump, or a compressor. However, the cylinder liner assembly may be particularly well suited for mitigating carbon deposits in the reciprocating engine. The anti-polishing ring may be coupled to the cylinder liner via one or more fasteners or, in certain embodiments, may form a single piece (e.g., single continuous piece) with the cylinder liner. The anti-polishing ring (e.g., annular anti-polishing ring) of the cylinder liner assembly includes a tapered portion and, in certain embodiments, a top portion directly coupled with the tapered portion. The tapered portion and the top portion are configured to protrude radially inward from an inner liner surface of the cylinder liner. A protrusion distance spanning from the inner liner surface to a top inner surface of the top portion and/or a tapered inner surface of the tapered portion is configured to decrease from a top side of the cylinder liner assembly in a downstroke direction of the piston. That is, the combined profile of the top inner surface and the tapered inner surface result in a reduced clearance between the anti-polishing ring and the top land of the piston when the piston is at top dead center.

As disclosed herein, the shape of the anti-polishing ring protrusion may take a combination of shapes. For example, the shape of the protrusion may be frustoconical, frustoconical with a radial step, outwardly curved, inwardly curved, or a combination thereof. It should also be recognized that the shape of the protrusion may vary about a circumferential direction of the anti-polishing ring. In certain embodiments, a simulation may be performed to empirically determine a plurality of minimal protrusion distances of the protrusion for mitigating bore polishing. In certain embodiments, the plurality of minimal protrusion distance may vary irregularly (e.g., non-repetitively) about a circumferential direction of the anti-polishing ring. For example, due to thermal distortions and positioning of the piston within the liner (e.g., thrust side versus anti-thrust side of the piston), the clearance between the piston and the liner may vary irregularly about the circumferential direction of the piston. Therefore, the plurality of minimal protrusion distances of the anti-polishing ring may be contoured or adapted to thermal distortions and positioning of the piston within the liner, such that the clearance between the anti-polishing ring and the piston is substantially uniform (e.g., plus or minus 1, 2, 3, 4, or 5 percent relative to an average clearance) about the circumferential direction of the piston and the anti-polishing ring.

Turning to the drawings, FIG. 1 is a schematic of an embodiment of a reciprocating piston system 8 having one or more anti-polishing rings. FIG. 1 is intended to provide context for the anti-polishing rings, which are discussed in further detail below. In certain embodiments, the reciprocating piston system 8 includes an engine 10 (e.g., a reciprocating piston-cylinder internal combustion engine or reciprocating engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. Any suitable oxidant may be used with the disclosed embodiments. The combustion chamber 12 is also configured to receive a fuel 18 (e.g., a liquid and/or gaseous fuel, hydrogen) from a fuel supply 19, and a fuel-air mixture ignites and combusts within each combustion chamber 12. The fuel 18 may be any suitable gaseous fuel, such as natural gas, associated petroleum gas, propane, biogas, sewage gas, landfill gas, coal mine gas, for example. The hot pressurized combustion gases cause a piston 20 adjacent to each combustion chamber 12 to reciprocate linearly or axially within a cylinder 26 and convert pressure exerted by the combustion gases into a rotating motion, which causes a shaft 22 (e.g., crankshaft) to rotate. Further, the shaft 22 may be coupled to a load 24, which is powered via rotation of the shaft 22. For example, the load 24 may be any suitable device that may generate power via the rotational output of the system 10, such as an electrical generator, a rotary compressor, a rotary pump, or other machinery.

In certain embodiments, the piston 20 may include a tight top land (TTL) piston. A TTL piston is a piston with the top land diametral clearance at the upper edge of the top land less than or equal to 0.34% of the bore diameter for steel or cast iron when in the cold condition. In certain embodiments, the top land diametral clearance at the upper edge of the top land may be less than or equal to 0.34%, 0.33%, 0.32%, 0.31, 0.30%, 0.29%, 0.28%, 0.27%, or 0.26% of the bore diameter for steel or cast iron when in the cold condition. The top land diametral clearance at the upper edge of the top land should be less than or equal to 0.60% of the bore diameter for aluminum when in the cold condition. In certain embodiments, the top land diametral clearance at the upper edge of the top land may be less than or equal to 0.60%, 0.59%, 0.58%, 0.57%, 0.56%, 0.55%, 0.54%, 0.53%, 0.52%, 0.51%, 0.50%, 0.49%, 0.48%, 0.47%, or 0.46% of the bore diameter for aluminum when in the cold condition. The top land clearances in the running conditions (i.e., hot clearances) will be reduced due to thermal expansion. The typical range for radial clearances in the hot condition vary between 25 μm to 75 μm approximately.

The reciprocating piston system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the reciprocating piston system 8 may include a large-scale industrial reciprocating engine having 4, 6, 8, 10, 16, 24 or more pistons 20 reciprocating in cylinders 26. In some such cases, the cylinders 26 and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000

RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. In certain embodiments, the engines 10 may include Jenbacher Engines (e.g., Jenbacher Type 2, Type 3, Type 4, Type 6 or J920 FleXtra) or Waukesha Engines (e.g., Waukesha VGF, VHP, APG, 275GL) made by INNIO of Jenbach, Austria.

The driven power generation system 8 may include one or more sensors 23 communicatively coupled to an engine control unit (ECU) or controller 25. The sensors 23 may include temperature sensors, pressure sensors, flow rate sensors, fuel composition sensors, knock sensors, oxygen sensors, emissions sensors, or any combination thereof. For example, the knock sensors are suitable for detecting engine "knock." The emissions sensors may include nitrogen oxide ($NO_X$) sensors, carbon oxide ($CO_X$) sensors, sulfur oxide ($SO_X$) sensors, or any combination thereof. The temperature, pressure, and flow rate sensors may be configured to monitor the temperature, pressure, and flow rate of a coolant and/or lubricant through the engine 10, such as through the engine block, the valve head, the pistons 20 (e.g., through a cooling gallery in the pistons 20), or any combination thereof. During operation of the engine 10, signals from the sensors 23 are communicated to the controller 25 to evaluate various conditions of the engine 10 and adjust operating parameters of the engine 10, including but not limited to a coolant flow rate, a lubricant flow rate, a fuel injection quantity and/or timing, an ignition timing, a boost pressure of intake air into the engine 10, or any combination thereof.

Figure 2:
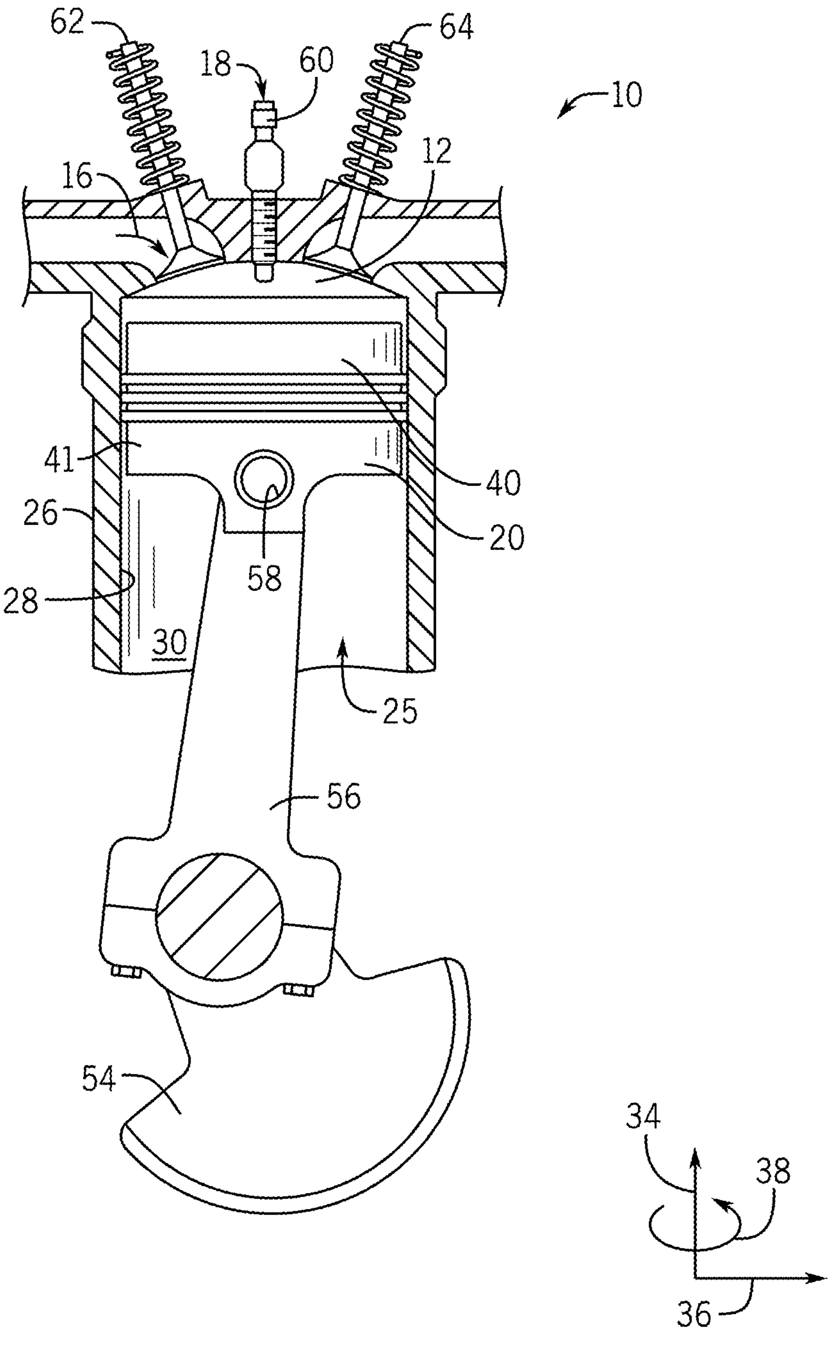
FIG. 2 is a cross-sectional side view of an embodiment of a piston within a cylinder of the reciprocating engine shown in FIG. 1 in accordance with aspects of the present disclosure.

FIG. 2 is a cross-sectional side view of an embodiment of a piston assembly 25 having a piston 20 disposed within a cylinder 26 (e.g., an engine cylinder) of the engine 10. The cylinder 26 has an inner annular wall 28 defining a cylindrical cavity 30 (e.g., bore), wherein the inner annular wall 28 includes a cylinder liner having an anti-polishing ring. Various aspects of the cylinder liner and anti-polishing ring are discussed in further detail below. The piston 20 may be defined by an axial axis or direction 34, a radial axis or direction 36, and a circumferential axis or direction 38. The piston 20 includes an upper or top portion 40 (e.g., a top land or crown portion). The top portion 40 generally blocks the fuel 18 and the air 16, or a fuel-air mixture, from escaping from the combustion chamber 12 during reciprocating motion of the piston 20. The piston 20 also includes a lower, bottom, or body portion 41 coupled to the top portion 40. For example, as discussed in detail below, the portions 40 and 41 of the piston 20 may be coupled together via a joint, or the portions 40 and 41 may collectively form a one-piece structure. Additionally, the portions 40 and 41 of the piston 20 may define a cooling gallery in the piston 20.

As shown, the piston 20 is attached to a crankshaft 54 via a connecting rod 56 and a pin 58. The crankshaft 54 converts the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, any suitable elements and/or techniques for providing fuel 18 and air 16 to the combustion chamber 12 and/or for discharging exhaust may be utilized in the engine 10. In operation, combustion of the fuel 18 with the air 16 in the combustion chamber 12 cause the piston 20 to move in a reciprocating manner (e.g., back and forth) in the axial direction 34 within the cavity 30 of the cylinder 26. During operations, when the piston 20 is at the highest point in the cylinder 26, it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

Figure 3:
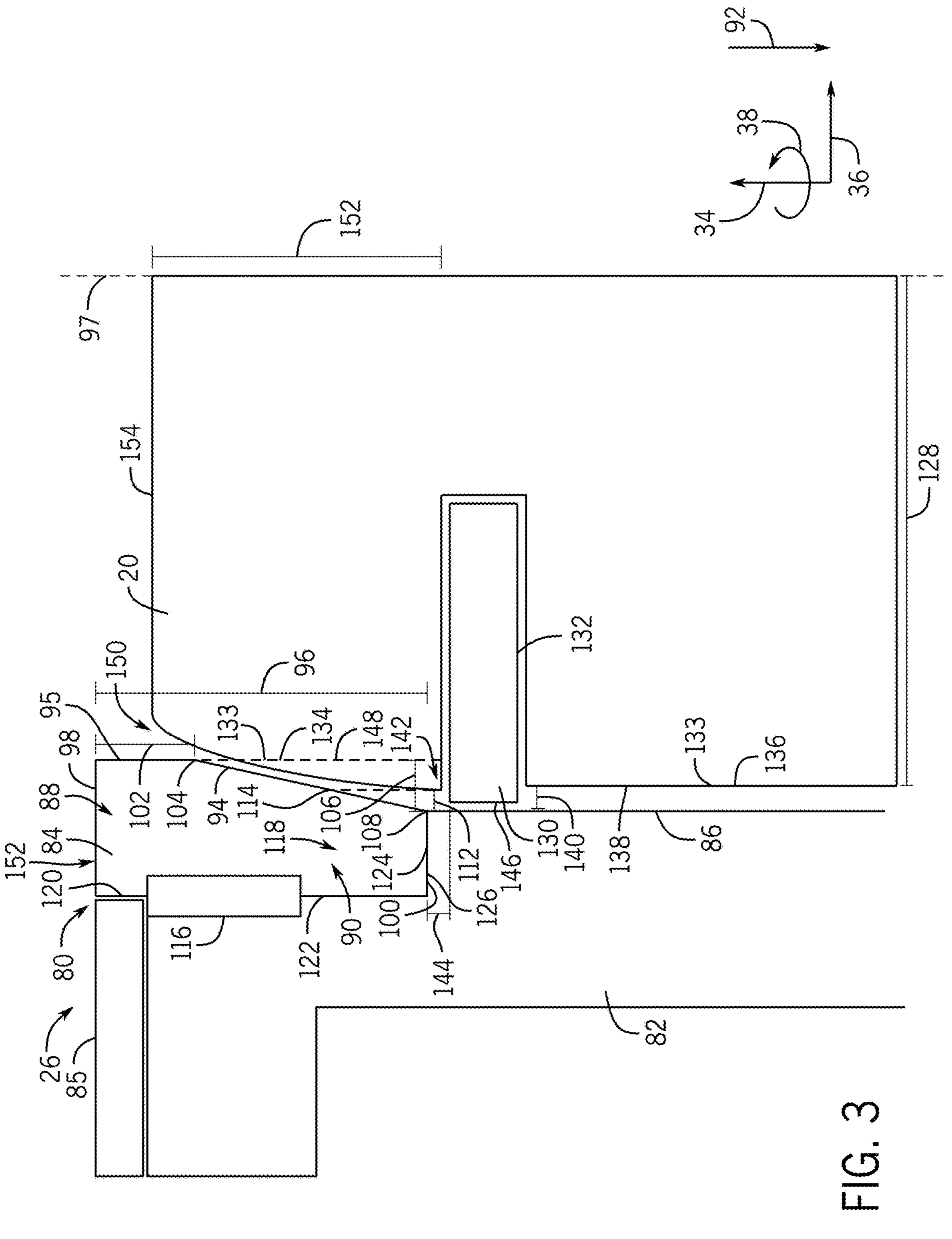
FIG. 3 is a cross-sectional side view of an embodiment of the piston of FIG. 2 and a cylinder liner assembly having a liner and an anti-polishing ring (anti-polishing ring) in accordance with aspects of the present disclosure.

FIG. 3 is a partial cross-sectional side view of an embodiment of the piston 20 disposed in the cylinder 26 as illustrated in FIG. 2, further illustrating details of a cylinder liner assembly 80 coupled to and lining an interior of the cylinder 26. As shown, the cylinder liner assembly 80 includes a cylinder liner 82 (e.g., annular cylinder liner, annular liner, or liner), an anti-polishing ring 84, and a gasket 85. In certain embodiments, the cylinder liner assembly 80 may come in the form of a kit including the cylinder liner 82, the anti-polishing ring 84, and the gasket 85. The cylinder liner 82 includes an inner liner surface 86 (e.g., annular inner liner surface, annular inner surface, inner surface, etc.). The anti-polishing ring 84 includes a top portion 88 (e.g., annular top portion) and a tapered portion 90 (e.g., annular tapered portion) extending from the top portion 88 in a downstroke direction 92 of the piston 20, which is opposite of the direction 34. In the illustrated embodiment, the tapered portion 90 includes a tapered inner surface 94 (e.g., annular tapered inner surface, annular tapered surface, or frustoconical inner surface) and the top portion 88 includes a top inner surface 95 (e.g., annular inner surface, annular top inner surface, or annular top surface). As shown, the top inner surface 95 is substantially axially parallel with a longitudinal central axis 97 of the piston 20. In certain embodiments, the top portion 88 is omitted from the anti-polishing ring 84.

In the illustrated embodiment, an anti-polishing ring height 96 extends from a top surface 98 of the anti-polishing ring 84 to a bottom surface 100 of the anti-polishing ring 84. Additionally, a top portion height 102 extends from the top surface 98 of the anti-polishing ring 84 to a transition height 104 that demarcates a bottom end of the top inner surface 95 and a top end of the tapered inner surface 94. In certain embodiments, the anti-polishing ring height 96 may be less than 10, 15, 20, 25, 30, 35, or 40 millimeters in length. In certain embodiments, the top portion height 102 may be less than 3, 5, 8, 10, 12, 15, or 18 millimeters in length. In certain embodiments, a ratio between the top portion height 102 (e.g., first axial length) and the anti-polishing ring height 96 (e.g., second axial length) is between 1:2 and 3:4, between 3:5 and 7:10, and/or between 11:18 and 13:18.

In the illustrated embodiment, a maximum protrusion distance 106 of the anti-polishing ring 84 is measured from a bottom intersection 108 of the bottom surface 100 and the tapered inner surface 94 and the top inner surface 95 of the top portion 88. A tapered protrusion distance 112 spans between the inner liner surface 86 and a location 114 on the tapered inner surface 94, wherein the tapered protrusion distance 112 may be the protrusion distance (e.g., variable distance) at any location along the tapered inner surface 94 (e.g., minimum distance, maximum distance, or intermediate distance between minimum and maximum distances). In certain embodiments, the maximum protrusion distance 106 is less than 20, 30, 40, 50, 60, 70, 80, or 90 micrometers. In certain embodiments, a ratio between the maximum protrusion distance 106 and the anti-polishing ring height 96 is between 1:400 and 1:190, between 1:390 and 1:200, and/or between 1:380 and 1:210. As discussed in further detail, in certain embodiments, the tapered protrusion distance 112 and/or the maximum protrusion distance 106 may vary about the circumferential direction 38 of the anti-polishing ring 84.

In the illustrated embodiment, the cylinder liner assembly 80 includes one or more fasteners 116 (e.g., pins, stakes, keys, threaded fasteners such as threaded screws and/or threaded bolts, etc.) configured to couple the anti-polishing ring 84 with cylinder liner 82. As shown, the cylinder liner 82 is configured to receive the anti-polishing ring 84 in a recess 118 (e.g., annular recess) of the cylinder liner 82. In the illustrated embodiment, the one or more fasteners 116 are configured to couple an outer annular surface 120 of the anti-polishing ring 84 with an inner annular recess surface 122 of the recess 118 of the cylinder liner 82. In certain embodiments, the one or more fasteners 116 may couple a bottom annular surface 124 of the anti-polishing ring 84 with a top annular surface 126 of the recess 118. In certain embodiments, the one or more fasteners 116 may include an axial key (e.g., rectangular key) disposed in a rectangular recess in the inner annular recess surface 122 and an opposite rectangular recess in the outer annular surface 120, such that the axial key blocks rotation of the anti-polishing ring 84 relative to the cylinder liner 82. The axial key and rectangular recesses may be oriented in an axial direction parallel to the longitudinal central axis 97. In any case, the one or more fasteners 116 are configured to block rotation in the circumferential direction 38 of the anti-polishing ring 84 relative to the cylinder liner 82 and/or rotation in the circumferential direction 38 of the cylinder liner 82 relative to the anti-polishing ring 84, thereby enabling the tapered inner surface 94, the top inner surface 95, and/or the inner liner surface 86 to be contour-honed using a single clamp. The anti-polishing ring 84 may be contour-honed in place within the cylinder liner 82, such that any desired variations in taper angle, protrusion distance 16, 112, and/or other geometrical characteristics of the surfaces 94, 95, and 86 can be made in the circumferential direction 38 to substantially match with variations in the piston 20 (e.g., variations due to thermal distortions, thrust side and anti-thrust sides of the piston 20, etc.). Contour honing may involve an abrasive machining process that produces a precision surface (e.g., circumference, geometry). For example, contour honing may include scrubbing an abrasive (e.g., grinding stone, grinding wheel) against the anti-polishing ring 84 along a controlled path. In certain embodiments, the contour honing of the anti-polishing ring 84 may include bore honing, flat honing, track honing, or a combination thereof.

In certain embodiments, the anti-polishing ring 84 may be configured to separate (e.g., be removed) from the cylinder liner 82. In certain embodiments, a separation of the anti-polishing ring 84 from the cylinder liner 82 may enable a removal of the piston 82 from a top side 127 of the cylinder 26. In certain embodiments, the one or more fasteners 116 may be omitted from the cylinder liner assembly 80, and the cylinder liner 82 and the anti-polishing ring 84 may be a single piece (e.g., single continuous piece). That is, the anti-polishing ring 84 and the cylinder liner 82 may form a single integrally-formed structure. It may be appreciated that hydrocarbon emissions may be reduced as a result of the anti-polishing ring 84 and the cylinder liner 82 being formed as a single integrally-formed structure due to the absence of a crevice between the anti-polishing ring 84 and the cylinder liner 82.

In the illustrated embodiment, the piston 20 has a radius 128 and includes a ring 130 radially disposed in a groove 132 (e.g., annular groove) of the piston 20. In the illustrated embodiment, the ring 130 is a top ring of the piston 20 and the groove 132 is a top groove of the piston 20. For example, the piston may include 2, 3, 4, 5, 6, 7, 8, or more rings 130 and corresponding grooves 132. It should be recognized that although the illustrated embodiment shows a single ring 130 and a single groove 132, the piston 20 may include a plurality of rings 130 disposed in a plurality of grooves 132. As shown, the ring 130 is axially disposed between two lands 133, an upper land 134 of the piston 20 and a lower land 136 of the piston 20. In the illustrated embodiment, the upper land 134 is the top land 40 (e.g., as discussed in FIG. 2) of the piston 20 and the lower land 136 is a second land of the piston 20. Although the illustrated embodiment shows the piston 20 as having two lands 133, the piston may include 3, 4, 5, 6, 7, 8, or more lands 133. In certain embodiments, the radius 128 may be more than 100 millimeters. For example the radius 128 may be more than 100, 120, 140, 160, 180, or 200 millimeters. In certain embodiments, a ratio between the maximum protrusion distance 106 and the radius 128 of the piston 20 is between 1:5,500 and 1:2,000, between 1:5,000 and 1:2,500, and/or between 1:4,750 and 1:2,700.

In the illustrated embodiment, the ring 130 protrudes from an outer radial surface 138 of the piston 20 by a protrusion distance 140. In certain embodiments, the protrusion distance 140 may be less than 200 micrometers. For example, the protrusion distance 140 may be less than 20, 40, 60, 80, 100, 120, 140, 160, 180, or 200 micrometers. A gap 142 between the ring 130 and the bottom intersection 108 has a gap height 144 during a top dead center position of the piston 20. In certain embodiments the gap height 144 may be less than one or more millimeters. For example, the gap height 144 may be less than 0.5, 0.8, 1.0, 1.2, 1.5, 1.8, 3.0, or 5.0 millimeters. In certain embodiments, the gap height 144 may be in the range of 1.2 to 1.5 millimeters. In certain embodiments, the gap height 144 may be a negative distance. For example, the ring 130 may overlap the tapered inner surface 94 by less than 1, 2, 3, 4, 5, 6, 7, 8, 9, or 10 millimeters. In the illustrated embodiment, the tapered inner surface 94 radially traverses an outer radial perimeter 146 of the ring 130. That is, the tapered inner surface 94 traverses a radius of the outer radial perimeter 146. In certain embodiments, the gap height 144 may be selected to avoid or reduce the possibility of the ring 130 moving axially across the tapered inner surface 94, whereas the piston 20 (e.g., top land 40) moves axially across tapered inner surface 94 at least to the maximum protrusion distance 106 along the top inner surface 95. However, if the ring 130 does move axially across the tapered inner surface 94, then the tapered inner surface 94 (e.g., frustoconical surface) may be configured to guide or self-center the ring 130 and the piston 20 relative to the longitudinal central axis 97.

In the illustrated embodiment, the tapered inner surface 94 of the tapered portion 90 is configured to protrude radially inward from the inner liner surface 86 toward the longitudinal central axis 97 and toward the piston 20. Additionally, the top inner surface 95 of the top portion 88 protrudes radially inward from the inner liner surface 86 toward the longitudinal central axis 97 and toward the piston 20. That is, the tapered inner surface 94 and the top inner surface 95 each radially protrude at least partially radially inward relative to the inner liner surface 86 of the cylinder liner 82 toward the longitudinal central axis 97 and toward the piston 20. In certain embodiments, the top inner surface 95 may be omitted. In the illustrated embodiment, the tapered protrusion distance 112, which spans from the inner liner surface 86 to a location 114 on the tapered inner surface 94, decreases along the downstroke direction 92 of the piston 20. That is, the maximum protrusion distance 106 of the anti-polishing ring 84 is located on the top portion 88 of the anti-polishing ring 84. In the illustrated embodiment, the top portion 88 is configured to encompass (e.g., surround, enclose) an outer radial surface 148 of the upper land 134 (e.g., top land) of the piston 20. In certain embodiments, a radial gap 150 (e.g., annular or substantially annular gap or clearance) spanning from the tapered inner surface 94 and/or the top inner surface 95 to the outer radial surface 148 of the piston is minimalized across the outer radial surface 148 of the upper land 134 when the piston 20 is at TDC. In the illustrated embodiment, a top surface 154 of the piston 20 is encompassed by the top inner surface 95 when the piston 20 is at TDC. In certain embodiments, the top surface 154 may be encompassed by the tapered inner surface 94 when the piston 20 is at TDC. In certain embodiments, the top portion 88 may be omitted from the anti-polishing ring 84. In certain embodiments, the radial gap 150 is relatively small to define a tight top land (TTL) clearance. It may be recognized that a TTL profile is a configuration where the clearance between the top land 134 and the cylinder liner 82 is reduced to reduce the amount of unburned hydrocarbon emissions, including methane ($CH_4$), carbon monoxide (CO), and formaldehyde.

Figure 4:
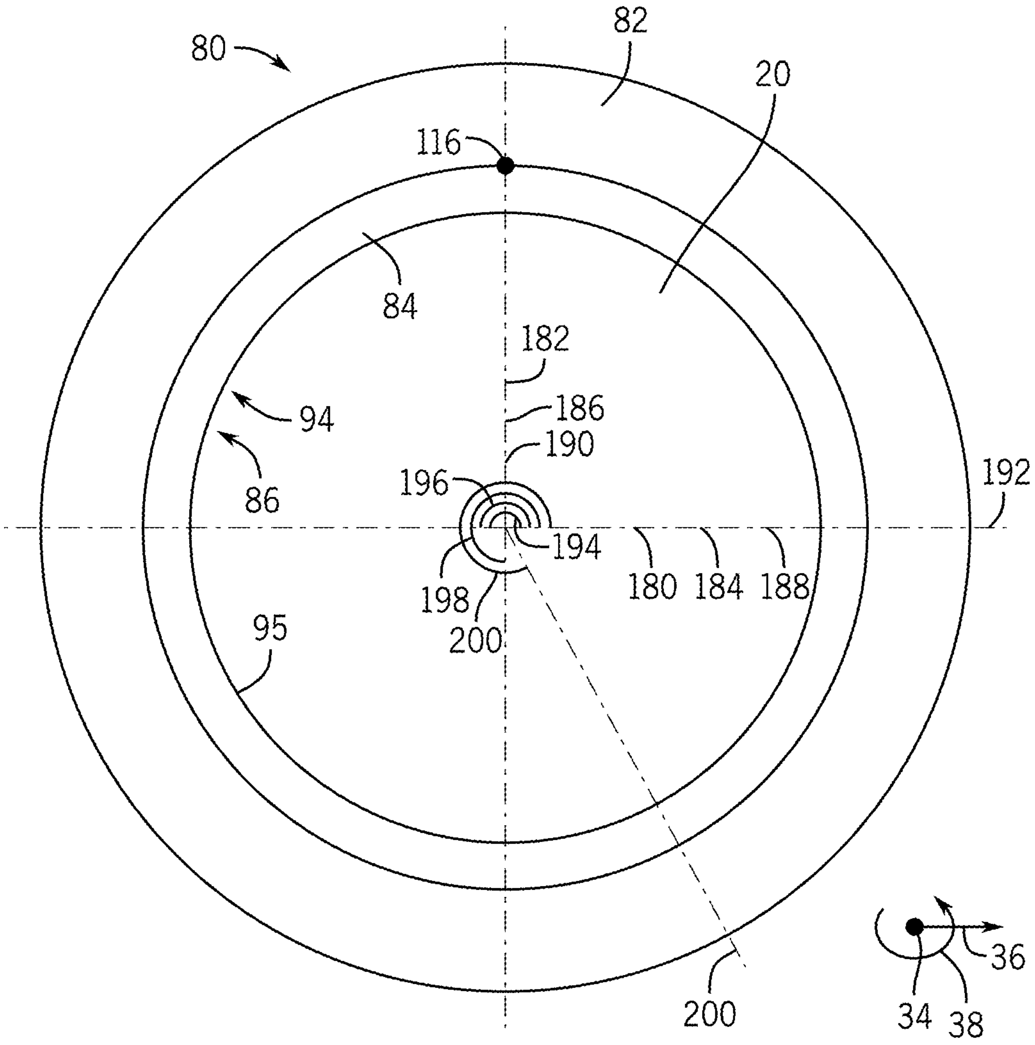
FIG. 4 is a top view an embodiment of the piston and the cylinder liner assembly of FIG. 3 in accordance with aspects of the present disclosure.

FIG. 4 is a top view of an embodiment of the piston 20 and the cylinder liner assembly 80. In the illustrated embodiment, the cylinder liner assembly 80 includes the cylinder liner 82 directly coupled to the anti-polishing ring 84. As shown, the anti-polishing ring 84 is directly coupled to the cylinder liner 82 via the one or more fasteners 116. Although the illustrated embodiment shows one fastener 116, it should be recognized that the anti-polishing ring 84 may be coupled to the cylinder liner 82 via 2, 3, 4, 5, 6, 7, 8, or more fasteners 116. In certain embodiments, the cylinder liner 82 and the anti-polishing ring 84 may be a single piece and the one or more fasteners 116 may be omitted. As shown, the piston 20 is disposed radially inward of the cylinder liner 82.

In the illustrated embodiment, radial axes 180 and 182 of the piston 20 coincide with radial axes 184 and 186 of the tapered inner surface 94 and/or the top inner surface 95 of the anti-polishing ring 84, as well as radial axes 188 and 190 of the inner liner surface 86 of the cylinder liner 82, respectively. In certain embodiments, prior to contour honing of the tapered inner surface 94, the top inner surface 95, and/or the inner liner surface 86, the radial axes 184 and 186 may not coincide with the radial axes 188 and 190, respectively. That is, contour-honing of the tapered inner surface 94, the top inner surface 95, and/or the inner liner surface 86, may align the radial axes 184 and 186 with the radial axes 188 and 190, respectively. That is, contour-honing may reduce a radial offset (e.g., disparity) between the tapered inner surface 94 and/or top inner surface 95 and the inner liner surface 86. It may be appreciated that by contour honing the anti-polishing ring 84 together with the cylinder liner 82 via a single clamp, the concentricity offset between the tapered inner surface 94 and/or top inner surface 95 and the inner liner surface 86 may be greatly reduced.

In the illustrated embodiment, the radial axes 180 and 182 (e.g., radial axes 184 and 186) intersect the anti-polishing ring 84 at a first angle 192 (e.g., 0 degrees), a second angle 194 (e.g., 90 degrees), a third angle 196 (180 degrees), and a fourth angle 198 (e.g., 270 degrees). As discussed in more detail herein, the tapered inner surface 94 and/or the top inner surface 95 of the anti-polishing ring 84 may have varying shapes at any circumferential angle 200 (e.g., including the first angle 192, second angle 194, third angle 196, and/or fourth angle 198) of the anti-polishing ring 84.

Figures 5, 6, 7, 8, 9, 10:
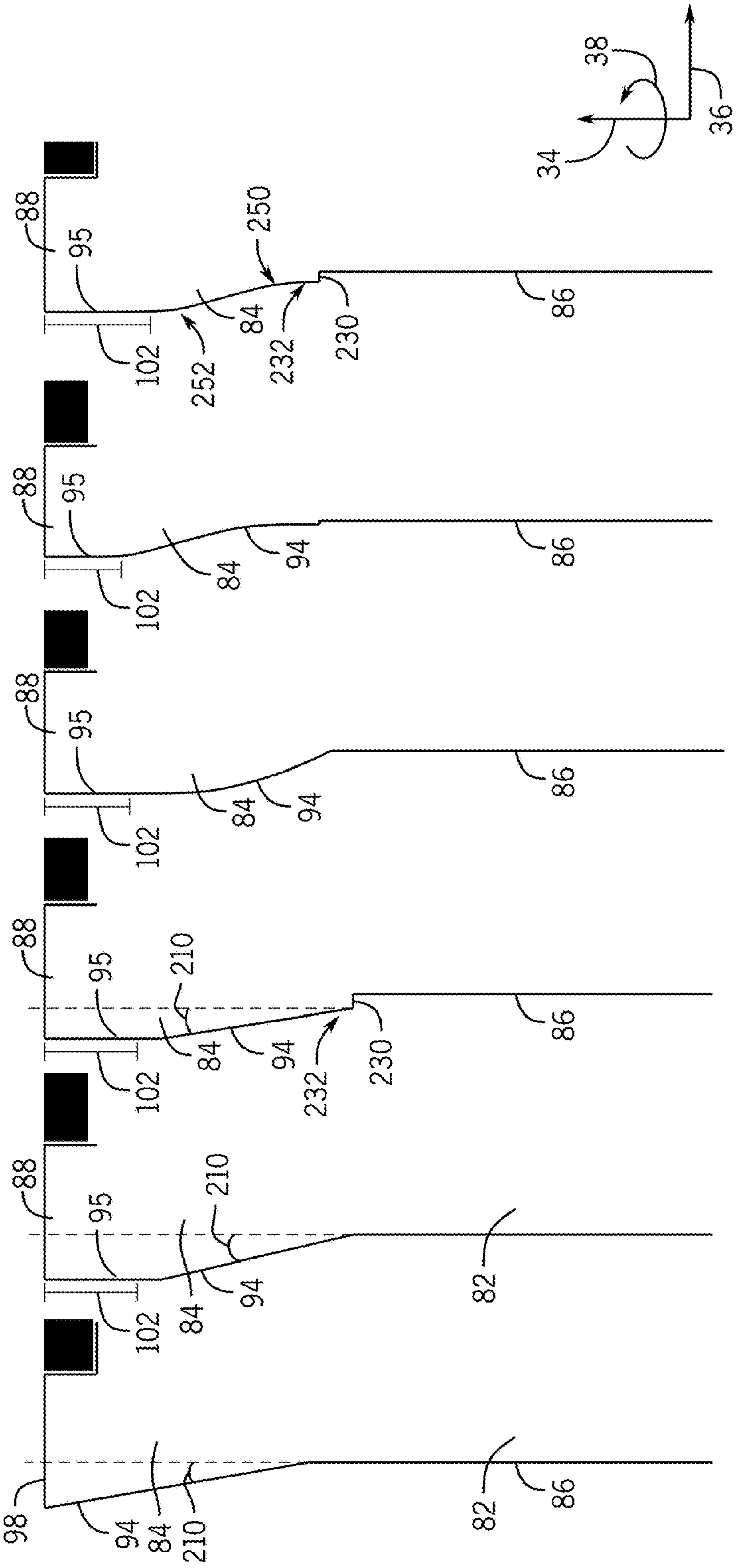
FIG. 5 is a partial cross-sectional view of an embodiment of the anti-polishing ring, illustrating a frustoconical shape.
FIG. 6 is a partial cross-sectional view of an embodiment of the anti-polishing ring 84, illustrating a cylindrical and frustoconical shape.
FIG. 7 is a partial cross-sectional view of an embodiment of the anti-polishing ring, illustrating a stepped frustoconical shape.
FIG. 8 is a partial cross-sectional view of an embodiment of the anti-polishing ring, illustrating an outwardly curved shape.
FIG. 9 is a partial cross-sectional view of an embodiment of the anti-polishing ring, illustrating an inwardly curved shape.
FIG. 10 is a partial cross-sectional view of an embodiment of the anti-polishing ring, illustrating a complex shape having aspects of FIGS. 6, 7, 8 and 9.

FIG. 5 is a partial cross-sectional view of an embodiment of the anti-polishing ring 84, illustrating a frustoconical shape. In the illustrated embodiment, the tapered inner surface 94 forms an acute angle 210 relative to the axial direction 34, and is disposed between the top surface 98 of the anti-polishing ring 84 and the inner liner surface 86. As shown, the top inner surface 95 is omitted from the anti-polishing ring 84. In certain embodiments, the acute angle 210 may be constant in the circumferential direction 38 about an entire circumference of the tapered inner surface 94 of the anti-polishing ring 84. In certain embodiments, the acute angle 210 may vary, repetitively and/or non-repetitively, in the circumferential direction 38 about the circumference of the tapered inner surface 94. In certain embodiments, during manufacturing when not operating the engine 10, the acute angle 210 may vary (e.g., continuously vary) based on expected distortions (e.g., thermal distortions) in the cylinder liner 82 and/or the piston 20 during operation of the engine 10, wherein the variations are configured to counter or oppose the expected distortions during operation. In the illustrated embodiment, the acute angle 210 is constant from the inner liner surface 86 of the cylinder liner 82 to the top surface 98 of the anti-polishing ring 84. In certain embodiments, the shape of the tapered inner surface 94 may include a plurality of line segments angled relative to each other. That is, the tapered inner surface 94 may include a linear piecewise shape.

FIG. 6 is a partial cross-sectional view of an embodiment of the anti-polishing ring 84, illustrating a cylindrical and frustoconical shape. In the illustrated embodiment, the tapered inner surface 94 forms an acute angle 210 relative to the axial direction 34, and is disposed between the top inner surface 95 of the anti-polishing ring 84 and the inner liner surface 86. As shown, the top inner surface 95 of the top portion 88 of the anti-polishing ring 84 forms the cylindrical portion of the anti-polishing ring 84. In certain embodiments, the acute angle 210 may be constant in the circumferential direction 38 about an entire circumference of the tapered inner surface 94 of the anti-polishing ring 84. In certain embodiments, the acute angle 210 may vary, repetitively and/or non-repetitively, in the circumferential direction 38 about the circumference of the tapered inner surface 94. In the illustrated embodiment, the acute angle 210 is constant from the inner liner surface 86 of the cylinder liner 82 to the top inner surface 95 of the anti-polishing ring 84. In certain embodiments, the shape of the tapered inner surface 94 may include a plurality of line segments angled relative to each other. That is, the tapered inner surface 94 may include a linear piecewise shape. Additionally or alternatively, the top portion height 102 may remain constant about the circumferential direction 38 about an entire circumference of the top portion 88 or, in certain embodiments, may vary about the circumferential direction 38 about the circumference of the top portion 88. In certain embodiments, during manufacturing when not operating the engine 10, the tapered inner surface 94 (e.g., acute angle 210, shape, and/or diameter) and/or the top inner surface 95 (e.g., diameter, shape, and/or height 102) may vary (e.g., continuously vary) based on expected distortions (e.g., thermal distortions) in the cylinder liner 82 and/or the piston 20 during operation of the engine 10, wherein the variations are configured to counter or oppose the expected distortions during operation.

FIG. 7 is a partial cross-sectional view of an embodiment of the anti-polishing ring 84, illustrating a stepped frusto-conical shape. In the illustrated embodiment, the tapered inner surface 94 forms an acute angle 210 relative to the axial direction 34, and is disposed between the top inner surface 95 of the anti-polishing ring 84 and the inner liner surface 86. As shown, the top inner surface 95 of the top portion 88 of the anti-polishing ring 84 forms the cylindrical portion of the anti-polishing ring 84. In certain embodiments, the acute angle 210 may be constant in the circumferential direction 38 about an entire circumference of the tapered inner surface 94 of the anti-polishing ring 84. In certain embodiments, the acute angle 210 may vary, repetitively and/or non-repetitively, in the circumferential direction 38 about the circumference of the tapered inner surface 94. In the illustrated embodiment, the acute angle 210 is constant from the inner liner surface 86 of the cylinder liner 82 to the top inner surface 95 of the anti-polishing ring 84. In certain embodiments, the shape of the tapered inner surface 94 may include a plurality of line segments angled relative to each other. That is, the tapered inner surface 94 may include a linear piecewise shape. Additionally or alternatively, the top portion height 102 may remain constant about the circumferential direction 38 of the top portion 88 or, in certain embodiments, may vary about the circumferential direction 38 of the top portion 88.

In the illustrated embodiment, the anti-polishing ring 84 includes a radial step 230 (e.g., annular radial lip or axially facing annular shoulder) that joins the tapered inner surface 94 with the inner liner surface 86. That is, a bottom end 232 of the tapered portion 90 includes the radial step 230, which is orthogonal to the cylinder liner 82 and extends radially outward from the piston. In certain embodiments, the radial step 230 may be less than 2, 4, 6, 8, 10, or 12 micrometers in length. In certain embodiments, the radial step 230 may be constant in length about the circumferential direction 38 of the anti-polishing ring 84. In certain embodiments, the radial step 230 may vary in length about the circumferential direction 38 of the anti-polishing ring 84. In certain embodiments, during manufacturing when not operating the engine 10, the tapered inner surface 94 (e.g., acute angle 210, shape, and/or diameter), the top inner surface 95 (e.g., diameter, shape, and/or height 102), and/or the radial step 230 may vary (e.g., continuously vary) based on expected distortions (e.g., thermal distortions) in the cylinder liner 82 and/or the piston 20 during operation of the engine 10, wherein the variations are configured to counter or oppose the expected distortions during operation.

FIG. 8 is a partial cross-sectional view of an embodiment of the anti-polishing ring 84, illustrating an outwardly curved annular shape. In the illustrated embodiment, the tapered inner surface 94 is outwardly (e.g., convexly) curved relative to the anti-polishing ring 84. That is, the tapered inner surface 94 bows radially inward relative to the central axis 97 of the piston 20 (see FIG. 3). As shown, the top inner surface 95 of the top portion 88 of the anti-polishing ring 84 forms a cylindrical portion of the anti-polishing ring 84. In certain embodiments, the curvature of the tapered inner surface 94 may be constant from the inner liner surface 86 to the top portion 88 and/or about the circumferential direction 38 about an entire circumference of the anti-polishing ring 84. Additionally or alternatively, the top portion height 102 may remain constant about the circumferential direction 38 of the top portion 88 or, in certain embodiments, may vary about the circumferential direction 38 about the circumference of the top portion 88. In certain embodiments, during manufacturing when not operating the engine 10, the tapered inner surface 94 (e.g., radius of curvature and/or shape) and/or the top inner surface 95 (e.g., diameter, shape, and/or height 102) may vary (e.g., continuously vary) based on expected distortions (e.g., thermal distortions) in the cylinder liner 82 and/or the piston 20 during operation of the engine 10, wherein the variations are configured to counter or oppose the expected distortions during operation.

FIG. 9 is a partial cross-sectional view of an embodiment of the anti-polishing ring 84, illustrating an inwardly curved annular shape. In the illustrated embodiment, the tapered inner surface 94 is inwardly (e.g., concavely) curved relative to the anti-polishing ring 84. That is, the tapered inner surface 94 bows radially outward relative to the central axis 97 of the piston 20 (see FIG. 3). As shown, the top inner surface 95 of the top portion 88 of the anti-polishing ring 84 forms a cylindrical portion of the anti-polishing ring 84. In certain embodiments, the curvature of the tapered inner surface 94 may be constant from the inner liner surface 86 to the top portion 88 and/or about the circumferential direction 38 about an entire circumference of the anti-polishing ring 84. Additionally or alternatively, the top portion height 102 may remain constant about the circumferential direction 38 of the top portion 88 or, in certain embodiments, may vary about the circumferential direction 38 of the circumference of the top portion 88. In certain embodiments, during manufacturing when not operating the engine 10, the tapered inner surface 94 (e.g., radius of curvature and/or shape) and/or the top inner surface 95 (e.g., diameter, shape, and/or height 102) may vary (e.g., continuously vary) based on expected distortions (e.g., thermal distortions) in the cylinder liner 82 and/or the piston 20 during operation of the engine 10, wherein the variations are configured to counter or oppose the expected distortions during operation.

FIG. 10 is a partial cross-sectional view of an embodiment of the anti-polishing ring 84, illustrating a complex shape having aspects of FIGS. 6, 7, 8 and 9 combined with one another. In the illustrated embodiment, the tapered inner surface 94 includes an inwardly curved portion 250 (e.g., concavely curved portion) that is inwardly curved relative to the anti-polishing ring 84. That is, the inwardly (e.g., concavely) curved portion 250 bows radially outward relative to the central axis 97 of the piston 20 (see FIG. 3). Additionally, the tapered inner surface 94 includes an outwardly curved portion 252 (e.g., convexly curved portion) that is outwardly curved relative to the anti-polishing ring 84. That is, the outwardly (e.g., convexly) curved portion 252 bows radially inward relative to the central axis 97 of the piston 20 (see FIG. 3). As shown, the top inner surface 95 of the top portion 88 of the anti-polishing ring 84 forms a cylindrical portion of the anti-polishing ring 84. In certain embodiments, the curvature of the inwardly curved portion 250 and/or the outwardly curved portion 252 may be constant from the inner liner surface 86 to the top portion 88 and/or about the circumferential direction 38 of an entire circumference of the anti-polishing ring 84. Additionally or alternatively, the top portion height 102 may remain constant about the circumferential direction 38 of the top portion 88 or, in certain embodiments, may vary about the circumferential direction 38 of the circumference of the top portion 88.

In the illustrated embodiment, the anti-polishing ring 84 includes a radial step 230 (e.g., annular radial lip or axially facing annular shoulder) that joins the tapered inner surface 94 with the inner liner surface 86. That is, a bottom end 232 of the tapered portion 90 includes the radial step 230, which is orthogonal to the cylinder liner 82 and extends radially outward from the piston. In certain embodiments, the radial step 230 may be less than 2, 4, 6, 8, 10, or 12 micrometers in length. In certain embodiments, the radial step 230 may be constant in length about the circumferential direction 38 of the anti-polishing ring 84. In certain embodiments, the radial step 230 may vary in length about the circumferential direction 38 of the anti-polishing ring 84. In certain embodiments, during manufacturing when not operating the engine 10, the tapered inner surface 94 (e.g., radius of curvature, inwardly curved, outwardly curved, shape, etc.), the top inner surface 95 (e.g., diameter, shape, and/or height 102), and/or the radial step 230 may vary (e.g., continuously vary) based on expected distortions (e.g., thermal distortions) in the cylinder liner 82 and/or the piston 20 during operation of the engine 10, wherein the variations are configured to counter or oppose the expected distortions during operation.

In certain embodiments, the tapered inner surface 94 and/or the top inner surface 95 of the anti-polishing ring 84 may include any combination of features described in FIGS. 5-10. In certain embodiments, any combination of the features described in FIGS. 5-10 may be present in different circumferential locations of the anti-polishing ring 84. For example, in reference to FIG. 4, the tapered inner surface 94 may be frustoconical (e.g., as described in FIG. 5) from the first angle 192 to the second angle 194, stepped frustoconical (e.g., as described in FIG. 7) from the second angle 194 to the third angle 196, outwardly (e.g., convexly) curved from the third angle 196 to the fourth angle 198, and inwardly (e.g., concavely) curved from the fourth angle 198 to the first angle 192. In certain embodiments, any combination of the features described in FIGS. 5-10 may be present within a generic (e.g., arbitrary) circumferential sector of the anti-polishing ring 84, that is, from one circumferential angle 200 to another circumferential angle 200. In certain embodiments, the anti-polishing ring 84 may include 2, 3, 4, 5, 6, 7, 8, 9, or more distinct circumferential sectors, with each sector having any combination of features described in FIGS. 5-10.

Figure 11:
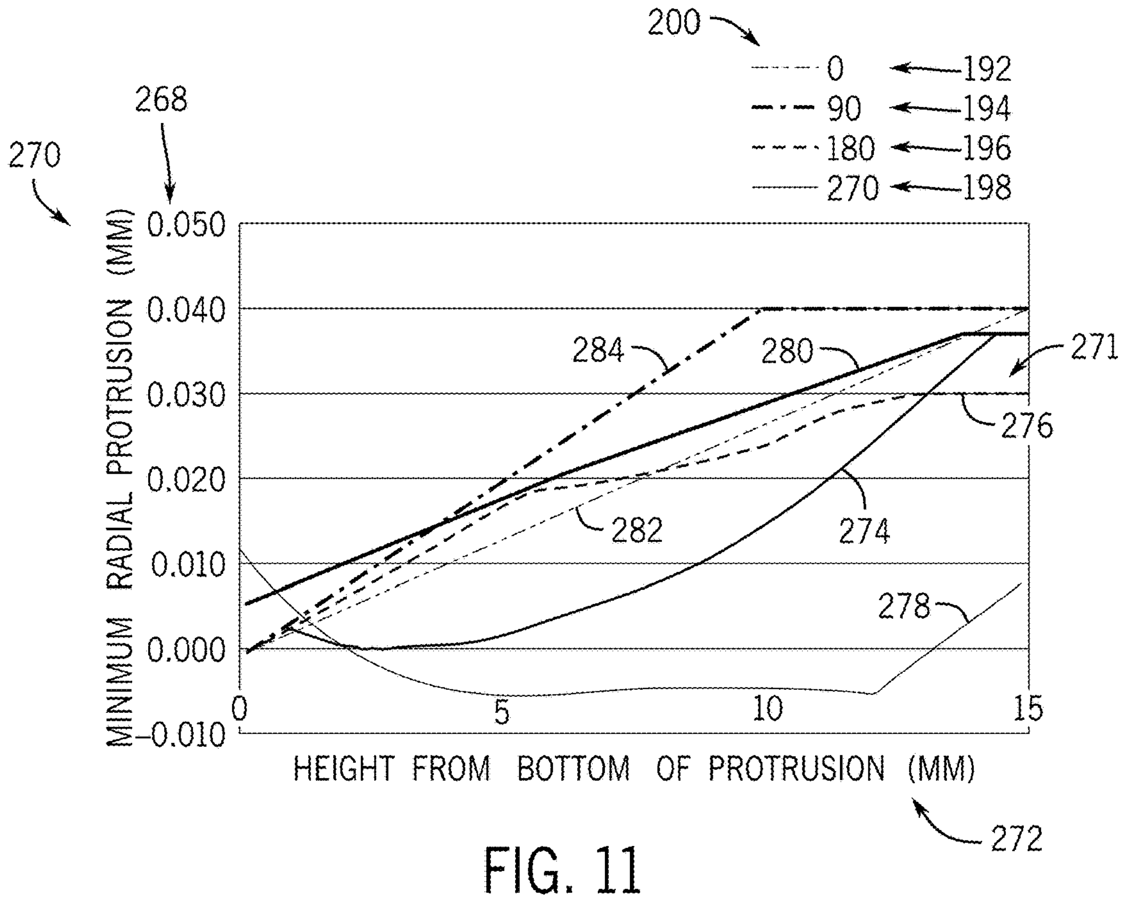
FIG. 11 is a graph of minimum radial protrusions to mitigate bore polishing relative to a height from a bottom of the protrusion for various circumferential positions of the anti-polishing ring, in accordance with aspects of the present disclosure.

FIG. 11 is a graph 268 of minimum radial protrusions 270 (e.g., minimal protrusions to mitigate bore polishing) relative to a height from a bottom of the protrusion 272 for various generic circumferential angles 200 of the anti-polishing ring 84. In the illustrated embodiment, the minimum radial protrusions 270 for mitigating bore polishing are plotted for the first angle 192, the second angle 194, the third angle 196, and the fourth angle 198, as referenced in FIG. 4. As shown, the graph 268 of minimum radial protrusions 270 includes a plurality of plotted lines 271 including a first line 274, a second line 276, a third line 278, and a fourth line 280, corresponding to the angles 192, 194, 196, and 198, respectively. As shown, the first line 274, the second line 276, and the fourth line 280 increase as the height from the bottom of the protrusion 272 increases. The minimum radial protrusion 270 corresponding to the angle 196 (e.g., the third line 278) is negative between approximately 3-13 millimeters from the bottom of the protrusion, due to piston 20 not contacting the liner 82 at the angle 196 due to the piston rod pushing the piston 20 to the opposite side.

In the illustrated embodiment, the dashed line 282 and the dashed line 284 show two potential shapes of the tapered inner surface 94 and/or top inner surface 95 of the anti-polishing ring 84. The dashed line 282 corresponds to the frustoconical shape described in FIG. 5, and the dashed line 284 corresponds to the cylindrical and frustoconical shape described in FIG. 6. In the illustrated embodiment, both the dashed line 282 and the dashed line 284 are proximate to an upper bound of the plurality of plotted lines 271. It should be recognized that while the illustrated embodiment shows two possible shapes of the tapered inner surface 94 and/or the top inner surface 95, other shapes that are generally proximate to the upper bound of the plurality of plotted lines 271 may be used.

Figure 12:
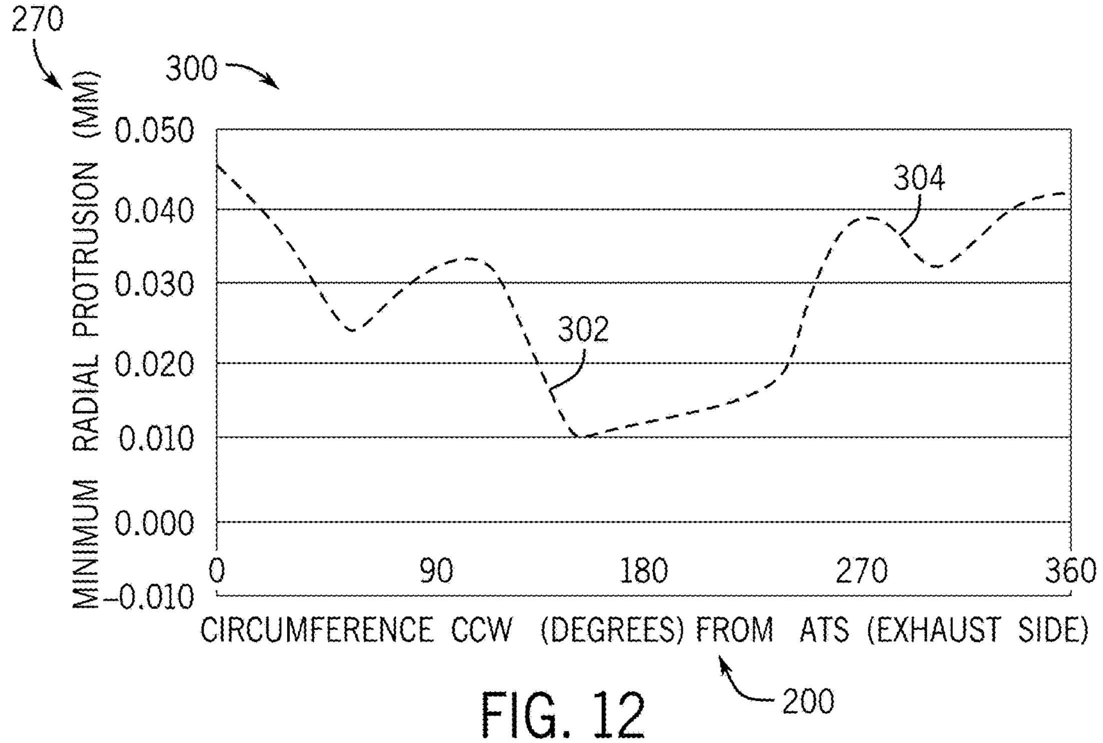
FIG. 12 is a graph of minimum radial protrusions to mitigate bore polishing relative to circumferential position of the anti-polishing ring, in accordance with aspects of the present disclosure.

FIG. 12 is a graph 300 of the minimum radial protrusion 270 to mitigate bore polishing relative to the circumferential angle 200 of the anti-polishing ring. In the illustrated embodiment, the minimal radial protrusion 270 is shown as a plotted line 302, which may represent empirical data collected from the cylinder liner 82 via a measuring apparatus. As shown, the plotted line 302 varies irregularly (e.g., non-repetitively, uniquely, nonuniformly, asymmetrically, etc.) relative to the circumferential angle 200. That is, although the minimal radial protrusion 270 is not necessarily random, there is no observable pattern in the variation of the minimal radial protrusion 270.

In the illustrated embodiment, the dashed line 304 represents a potential irregular shape of the tapered inner surface 94 and/or top inner surface 95 of the anti-polishing ring 84. In the illustrated embodiment, the dashed line 304 is proximate to the plotted line 302. It should be recognized that while the illustrated embodiment shows one possible shape of the tapered inner surface 94 and/or the top inner surface 95, other shapes that are generally proximate to the plotted line 302 may be used.

Figure 13:
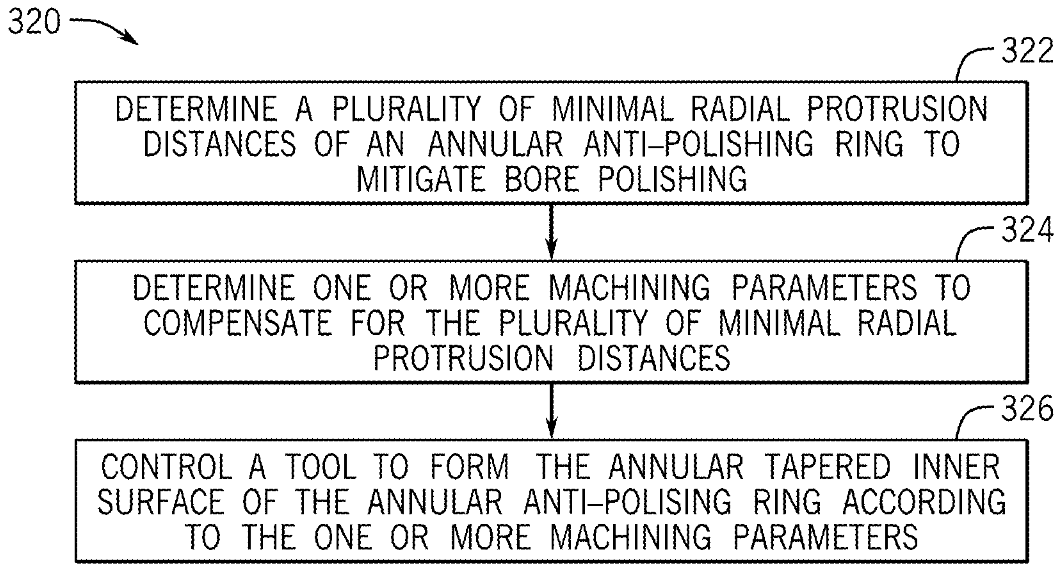
FIG. 13 is an example process for forming an inner radial surface of the anti-polishing ring, in accordance with aspects of the present disclosure.

FIG. 13 is a flowchart of an example process 320 for forming an inner radial surface of the anti-polishing ring 84. The process 320 may be performed by a processor-based computing device or controller of a manufacturing system or any other suitable computing device(s) or controller(s). Furthermore, the blocks of the process 320 may be performed in the order disclosed herein or in any other suitable order. For example, certain blocks of the process 320 may be performed concurrently. In addition, in certain embodiments, at least one of the blocks of the process 320 may be omitted.

In block 322 of the process 320, a controller determines a plurality of minimal radial protrusion distances of an anti-polishing ring 84 to mitigate bore polishing. For example, the controller may execute one or more simulations using multi-body dynamics software (e.g., AVL Excite™) to determine the plurality of minimal radial protrusion distances to mitigate bore polishing relative to an angular position in a circumferential direction of the anti-polishing ring 84.

In block 324 of the process 320, the controller determines one or more machining parameters to compensate for the plurality of determined minimal radial protrusion distances. For example, the controller may determine an upper bound of the plurality of determined minimal radial protrusion distances and generate an approximation of the upper bound. This upper bound approximation may be used to modify one or more machine parameters (e.g., position, orientation, force, etc.) associated with a machining apparatus.

In block 326 of the process 320, the controller controls a tool to form the tapered inner surface of the anti-polishing ring 84 according to the one or more machining parameters. For example, the controller may control the amount of force applied by the tool according to the one or more modified machining parameters. The controller may include one or more control loops (e.g., proportional integral derivative [PID] controller) that drives a measured machining parameter (e.g., measured force) to a setpoint machining parameter (e.g., setpoint force) using one or more feedback loops.

Technical effects of the disclosed embodiments include mitigating tolerance stack-up between honing surfaces (e.g., tapered inner surface, top inner surface, inner liner surface) of the anti-polishing ring and the cylinder liner. By securing the anti-polishing ring to the cylinder liner, the cylinder liner assembly may be honed in one liner clamping, thereby reducing the concentricity offset between the anti-polishing ring and the cylinder liner. Additionally, separating the anti-polishing ring from the cylinder liner may enable removal of the piston from the cylinder liner (e.g., cylinder) from a top side of the cylinder liner, thereby providing easier access for maintenance. Additionally, the anti-polishing ring having the protrusion as disclosed herein also mitigates bore polishing of the cylinder liner by mitigating the formation of carbon about the piston. Additional technical effects include significantly reduced total hydrocarbon (THC) emissions and lower manufacturing costs as compared to laser cladding. Finally, the reduced crevice volumes between the piston and the anti-polishing ring reduce overall temperature in and around the piston due to less heat transfer into the top land. The reduced temperature results result in carbon deposits and their associated failure modes being significantly reduced. Finally, the reduced temperatures result in reduced wear of the anti-polishing ring due to improved oil film viscosity. The reduced temperatures also enable further reducing crevice volume and emissions by reducing the height of the top land.

The subject matter described in detail above may be defined by one or more clauses, as set forth below.

According to a first aspect, a system includes a cylinder liner assembly configured to line a cylinder around a tight top land piston. The cylinder liner assembly includes a cylinder liner having an inner liner surface extending circumferentially about a central axis and an anti-polishing ring.

The system of the preceding clause, wherein the anti-polishing ring includes a top portion extending circumferentially about the central axis; and a tapered portion extending from the top portion in a downstroke direction of the tight top land piston, and the tapered portion includes a tapered inner surface extending circumferentially about the central axis.

The system of any preceding clause, wherein the tapered inner surface is configured to protrude radially inward from the inner liner surface, and a protrusion distance of the tapered inner surface spanning from the inner liner surface to the tapered inner surface decreases along the downstroke direction of the tight top land piston.

The system of any preceding clause, wherein the top portion is configured to encompass a radial perimeter of a top land of the tight top land piston in a top dead center (TDC) position of the tight top land piston.

The system of any preceding clause, wherein the protrusion distance of the tapered inner surface varies circumferentially about the anti-polishing ring based on an irregular pattern.

The system of any preceding clause, wherein the tapered inner surface includes an inner radius that varies over a range from a first radius to a second radius, a top ring of the tight top land piston has an outer radius that is between the first and second radii of the range, and the top ring traverses over the tapered inner surface when the tight top land piston is at a top dead center (TDC) position.

The system of any preceding clause, wherein the inner liner surface is substantially annular, the top portion is substantially annular, and the tapered inner surface is substantially annular.

The system of any preceding clause, wherein the cylinder liner and the anti-polishing ring form a single continuous piece.

The system of any preceding clause, wherein the anti-polishing ring is coupled to the cylinder liner via one or more fasteners, wherein the one or more fasteners block a circumferential rotation of the anti-polishing ring relative to the cylinder liner.

The system of any preceding clause, wherein the anti-polishing ring is configured to separate from the cylinder liner, wherein the cylinder liner assembly is configured to enable a removal of the tight top land piston from the cylinder liner after a separation of the anti-polishing ring and the cylinder liner.

The system of any preceding clause, wherein the tapered inner surface of the anti-polishing ring and the inner liner surface of the cylinder liner are configured to be contour-honed, wherein the anti-polishing ring and the cylinder liner include separate pieces; or a single continuous piece.

The system of any preceding clause, wherein a ratio between a maximum protrusion distance spanning from the liner inner surface to the tapered inner surface, and an axial length of the anti-polishing ring is between 1:400 and 1:200.

The system of any preceding clause, wherein the top portion includes a top inner surface extending circumferentially about the central axis, wherein the top inner surface has a constant radius relative to the central axis in an axial direction along the central axis.

The system of any preceding clause, wherein a ratio between a first axial length of the top inner surface and a second axial length of the anti-polishing ring is between 1:2 and 3:4.

The system of any preceding clause, a radial distance extending from an inner surface of the anti-polishing ring to an outer surface of the tight top land piston is minimal when the tight top land piston is at a top dead center (TDC) position.

According to a second aspect, a system includes a piston having a tight top land. The system also includes a cylinder liner. The cylinder liner includes an anti-polishing ring having a tapered portion. The tapered portion is configured to overlap the tight top land when the piston is disposed in a top dead center position.

The system of the preceding clause, wherein the anti-polishing ring includes a top portion extending circumferentially about a central axis; and the tapered portion extending from the top portion in a downstroke direction of the piston, and the tapered portion includes a tapered inner surface extending circumferentially about the central axis.

The system of any preceding clause, wherein the tapered inner surface is configured to protrude radially inward from an inner liner surface of the cylinder liner, and a protrusion distance of the tapered inner surface spanning from the inner liner surface to the tapered inner surface decreases along the downstroke direction of the piston.

The system of any preceding clause, wherein a ratio between a maximum protrusion distance spanning from the liner inner surface to the tapered inner surface, and a radius of the piston is between 1:4,750 and 1:2,700.

According to a third aspect, a method includes providing a cylinder liner comprising an inner liner surface extending circumferentially about a central axis. The method also includes providing an anti-polishing ring, wherein cylinder liner and the anti-polishing ring are portions of a cylinder liner assembly configured to line a cylinder around a tight top land piston.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:

a cylinder liner assembly configured to line a cylinder around a piston, wherein the cylinder liner assembly comprises:

a cylinder liner comprising an inner liner surface extending circumferentially about a central axis; and an anti-polishing ring coupled to the cylinder liner, wherein the anti-polishing ring comprises a tapered inner surface extending circumferentially about the central axis;

wherein a radial distance spanning from an outer radial surface of a top land of the piston at a top end of the top land to the anti-polishing ring is less than 0.34% of a bore diameter of the cylinder;

wherein a first axial height spanning from a bottom surface of the anti-polishing ring to a top end of the tapered inner surface is greater than half of a second axial height spanning from a top surface of a top ring groove of the piston to an additional top surface of the piston.

2. The system of claim 1, wherein the anti-polishing ring comprises:

a top portion extending circumferentially about the central axis; and a tapered portion extending from the top portion in a downstroke direction of the piston, and the tapered portion comprises the tapered inner surface extending circumferentially about the central axis.

3. The system of claim 2, wherein the tapered inner surface is configured to protrude radially inward from the inner liner surface, and a protrusion distance of the tapered inner surface spanning from the inner liner surface to the tapered inner surface decreases along the downstroke direction of the piston.

4. The system of claim 3, wherein the top portion is configured to encompass a radial perimeter of the top land of the piston in a top dead center (TDC) position of the piston.

5. The system of claim 3, wherein the protrusion distance of the tapered inner surface varies circumferentially about the central axis based on an irregular pattern, wherein the protrusion distance varies unevenly by alternating in opposite directions with an irregular amplitude peak to peak.

6. The system of claim 3, wherein the tapered inner surface comprises an inner radius that varies over a range from a first radius to a second radius, a top ring of the piston has an outer radius that is between the first and second radii of the range.

7. The system of claim 6, wherein the top ring traverses over the tapered inner surface when the piston is at a top dead center (TDC) position.

8. The system of claim 3, wherein the inner liner surface is substantially annular, the top portion is substantially annular, the tapered inner surface is substantially annular, wherein the first axial height is greater than half of a third axial height spanning from the bottom surface of the anti-polishing ring to a top surface of the cylinder liner.

9. The system of claim 3, wherein the cylinder liner and the anti-polishing ring form a single continuous piece.

10. The system of claim 3, wherein the anti-polishing ring is coupled to the cylinder liner via one or more fasteners, wherein the one or more fasteners block a circumferential rotation of the anti-polishing ring relative to the cylinder liner.

11. The system of claim 10, wherein the anti-polishing ring is configured to separate from the cylinder liner, wherein a separation of the anti-polishing ring and the cylinder liner is configured to enable a removal of the piston from the cylinder liner.

12. The system of claim 3, comprising the piston, wherein the cylinder is disposed about the piston.

13. The system of claim 3, wherein a ratio between a maximum protrusion distance spanning from the liner inner surface to the tapered inner surface, and an axial length of the anti-polishing ring is between 1:400 and 1:200.

14. The system of claim 3, wherein the top portion comprises a top inner surface extending circumferentially about the central axis, wherein the top inner surface has a constant radius relative to the central axis in an axial direction along the central axis.

15. A system, comprising:

a piston comprising a top land;

a cylinder liner disposed about the piston and configured to line a cylinder, wherein the cylinder liner comprises an inner liner surface extending circumferentially about a central axis of the piston; and an anti-polishing ring coupled to the cylinder liner, wherein the anti-polishing ring comprises a tapered portion, and the tapered portion is configured to overlap the top land when the piston is disposed in a top dead center position;

wherein a radial distance spanning from an outer radial surface of the top land at a top end of the top land to the anti-polishing ring is less than 0.34% of a bore diameter of the cylinder;

wherein a first axial height spanning from a bottom surface of the anti-polishing ring to a top end of the tapered inner surface is greater than half of a second axial height spanning from a top surface of a top ring groove of the piston to an additional top surface of the piston.

16. The system of claim 15, wherein the anti-polishing ring comprises:

a top portion extending circumferentially about the central axis; and the tapered portion extending from the top portion in a downstroke direction of the piston, the tapered portion comprises the tapered inner surface, and the tapered inner surface extends circumferentially about the central axis.

17. The system of claim 16, wherein the tapered inner surface is configured to protrude radially inward from the inner liner surface, and a protrusion distance of the tapered inner surface spanning from the inner liner surface to the tapered inner surface decreases along the downstroke direction of the piston.

18. The system of claim 17, wherein a ratio between a maximum protrusion distance spanning from the inner liner surface to the tapered inner surface, and a radius of the piston is between 1:4,750 and 1:2,700.

19. The system of claim 17, wherein the protrusion distance of the tapered inner surface varies circumferentially about the central axis based on an irregular pattern, wherein the protrusion distance varies unevenly by alternating in opposite directions with an irregular amplitude peak to peak.

20. A method, comprising:

providing a cylinder liner comprising an inner liner surface extending circumferentially about a central axis; and providing an anti-polishing ring, wherein the cylinder liner and the anti-polishing ring are portions of a cylinder liner assembly configured to line a cylinder around a piston, wherein the anti-polishing ring comprises a tapered inner surface extending circumferentially about the central axis, wherein a radial distance spanning from an outer radial surface of a top land of the piston at a top end of the top land to the anti-polishing ring is less than 0.34% of a bore diameter of the cylinder, wherein a first axial height spanning from a bottom surface of the anti-polishing ring to a top end of the tapered inner surface is greater than half of a second axial height spanning from a top surface of a top ring groove of the piston to an additional top surface of the piston.

* * * * *